Nov. 24, 1925.

C. JOHNSON 1,562,772

FILING GAUGE FOR CONNECTING ROD BEARING CAPS

Filed Jan. 21, 1925

Inventor
Conrad Johnson
By
Attorney

Patented Nov. 24, 1925.

1,562,772

UNITED STATES PATENT OFFICE.

CONRAD JOHNSON, OF PORTLAND, OREGON.

FILING GAUGE FOR CONNECTING-ROD-BEARING CAPS.

Application filed January 21, 1925. Serial No. 3,814.

*To all whom it may concern:*

Be it known that I, CONRAD JOHNSON, a citizen of the United States, residing at Portland, in the county of Multnomah and State of Oregon, have invented certain new and useful Improvements in a Filing Gauge for Connecting-Rod-Bearing Caps, of which the following is a specification.

This invention relates to a highly novel means for use in connection with the gauging and filing of the laterally extending ears of a bearing cap which contact with the respective ears of the lower portion of a connecting rod whereby the bearing cap may be secured around the crank shaft to the connecting rod bearing so that the looseness or play in the bearing will be completely taken up and causing the inner surfaces of the cap and bearing to be in engagement with the crank shaft, thus preventing undue and uneven wear.

A further object of the invention is to provide a gauge of the above mentioned character, which includes a means for accurately ascertaining the amount of the metal which is to be filed away from the laterally extending ears of the bearing cap in order that the latter may be properly associated with the connecting rod bearing.

A further object of the invention is to provide a device of the above mentioned character, which may be readily and easily associated with a connecting rod bearing by removing the usual bearing cap for obtaining one adjustment, means being further provided for transferring the adjustment so that the last mentioned means may be associated with a bearing cap for obtaining the proper thickness of the bearing cap before securing the latter to the connecting rod bearing thus obviating the necessity of having to adjust the bearing cap after the same is in assembled relation with respect to the bearing.

A further object is to provide a device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1:
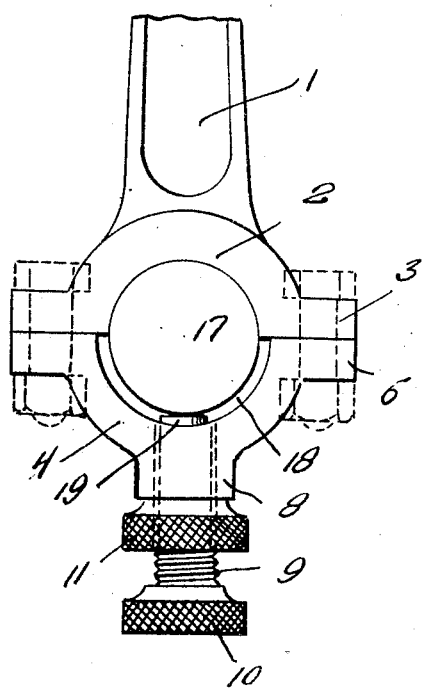
Figure 1 is a side elevation of one of the sections of my improved gauge showing the same in use.
Figure 2:
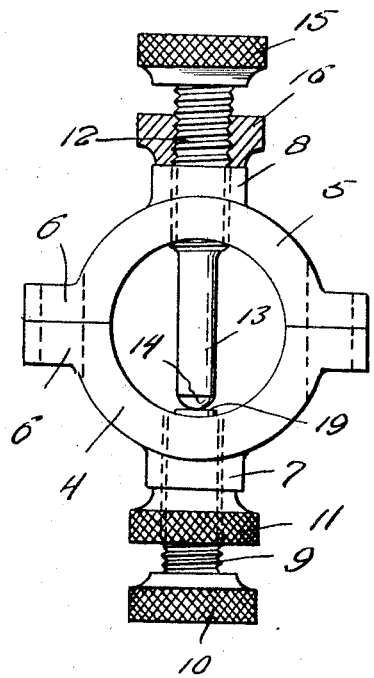
Figure 2 is a side elevation of the gauge per se.

In the drawing, wherein for the purpose of illustration is shown the preferred embodiment of my invention, the numeral 1 designates a connecting rod which is provided at its lower end with the semi-circular portion 2 which forms the upper half of the usual connecting rod bearing, the laterally extending ears are formed on the opposite sides thereof as illustrated at 3. In fitting bearing caps to the lower ends of the connecting rods, oftentimes looseness and play will occur between the Babbitt lining of the bearing and the crank shaft and as a result, undue and uneven wear will take place. In order to overcome the above disadvantages and enable a bearing cap to be properly secured in position to the lower half of the bearing formed on the lower end of the connecting rod, I provide a gauge, the construction of which will be presently described.

My improved gauge comprises the lower and upper complementary semi-circular sections 4 and 5 respectively, each of which is provided with the opposed ears 6. A tubular extension 7 is formed on the bottom of the lower section 4 and a similar extension 8 is formed on the top of the upper section 5. A gauge screw 9 is threaded through the extension 7 and the bottom of the semi-circular lower section 4, a knurled head 10 being formed on the lower end of the screw for actuating the same. A lock nut 11 is associated with the screw 9 for holding the same in its various adjusted positions.

A gauge screw 12 is threaded through the extension 8 formed on the top of the upper section 5 and also through the top of the upper section. The lower end of the gauge screw 12 is reduced and is in the form of a rod illustrated at 13, the lower end of the rod being rounded as illustrated at 14. The purpose of this construction will hereinafter be more fully described. A knurled head 15 is formed on the upper end of the screw 12 for actuating the same and a lock nut 16 similar to the lock nut 11 is associated with the screw 12 for holding the same in its various adjusted positions.

The use of my improved gauge may be briefly stated as follows: The lower semi-circular section 4 is adapted to be secured to the semi-circular section 2 on the lower end of the connecting rod 1 by having the ears 6 on the lower section 4 cooperating with the ears 3 formed on the section 2 of the connecting rod 1 and having the usual securing bolts extending through the openings provided in the ears. It is of course to be understood that when the section 4 is secured to the lower end of the connecting rod, the usual bearing cap is removed. The lower section 4 is of substantially the same construction as the usual bearing caps with the exception that the inner surface of the section 4 has a slightly larger radius than the crank shaft 17 so that the lower section 4 will be spaced from the crank shaft 17 at all points as illustrated at 18. After the lower section 4 has been secured in position around the crank shaft 17 to the lower end of the connecting rod 1, the screw 9 is then turned until the flat upper end 19 is in engagement with the crank shaft as illustrated more clearly in Figure 1.

The lock nut 11 is then actuated so as to prevent the further movement of the screw 9. The lower section 4 is then detached from the lower end of the connecting rod and the upper complementary semi-circular section 5 is then secured to the lower section 4 by having any suitable fastening means extending through the openings provided in the opposed ears formed on the complementary sections. The screw 12 is then actuated so as to cause the rounded lower end 14 of the screw 12 to be brought into engagement with the flat upper end 19 of the opposed screw 9. The lock nut 16 is then actuated whereby further movement of the screw 12 is prevented.

Figure 3:
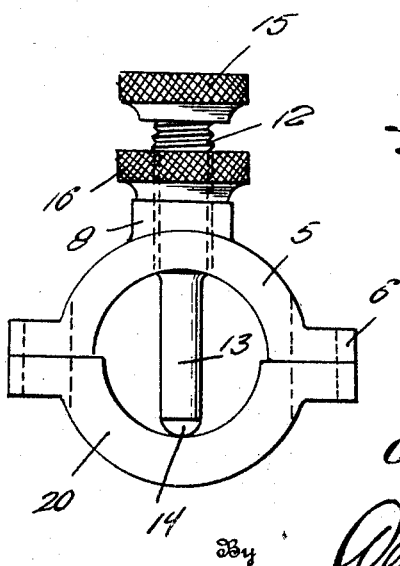
Figure 3 is a side elevation of the other section of the gauge showing the manner in which the same is used in conjunction with a bearing cap.

The upper section 5 is then removed from the lower complementary section 4 and a bearing cap 20 which is to be fitted to the upper half of the bearing for the connecting rod has its laterally extending ears filed until the rounded lower end 14 of the gauge screw 12 will come in contact with the inner surface of the bearing cap 20 when the latter is fitted to the upper section 5 of the gauge in the manner clearly illustrated in Figure 3. After the bearing cap 20 has its laterally extending ears filed to the proper degree, the bearing cap is then attached to the upper half 2 of the bearing for the connecting rod and the Babbitt lining of the bearing cap will fit properly around the lower half of the crank shaft in such a manner as to prevent any undue and any uneven wear.

The provision of a gauge of the above mentioned character, enables the same to be readily and easily associated with the lower end of the connecting rod and the bearing cap therefor and will at all times be positive and efficient in its operation. It is to be understood that a micrometer scale may be used in conjunction with the threaded gauge member if so desired. The measurement obtained by my gauge will at all times be accurate and the lock nut will hold the threaded gauge members in their proper adjusted positions.

While I have shown the preferred embodiments of my invention it is to be understood, that various changes in the size, shape and arrangement of parts may be resorted to without departing from the spirit of the invention and the scope of the appended claims.

Having thus described the invention, what I claim is:—

1. A gauge for connecting rod bearing caps comprising a pair of complementary semi-circular sections, said sections having surfaces adapted to contact with one another when the sections are disposed in a predetermined relation relatively to each other, and opposed gauge members threaded through said sections, the opposite ends of said gauge members adapted for engagement when said sections are disposed in said predetermined relation.

2. A gauge for connecting rod bearing caps comprising a pair of complementary semi-circular sections, said sections having surfaces adapted to contact with one another when the sections are disposed in a predetermined relation relatively to each other, and opposed gauge members threaded through said sections, the opposed ends of said gauge members adapted for engagement when said sections are disposed in said predetermined relation, and means for locking the gauge members in their adjusted positions.

3. A gauge for connecting rod bearing caps comprising a pair of complementary semi-circular sections, said sections having surfaces adapted to contact with one another when the sections are disposed in a predetermined relation relatively to each other, opposed gauge screws threaded through the central portions of the sections, the opposed ends of said gauge screws being adapted for engagement with each other when said sections are disposed in said predetermined relation, and lock nuts associated with the gauge screws for holding the same in their adjusted positions.

4. A gauge for connecting rod bearing caps comprising a pair of complementary semi-circular sections, said sections having surfaces adapted to contact with one another when the sections are disposed in a predetermined relation relatively to each other, and opposed gauge members threaded through said sections, the opposed ends of said gauge members adapted for engagement when said sections are disposed in said predetermined relation, means for locking the gauge members in their adjusted positions, one of said sections adapted to be secured to the lower end of a connecting rod, the gauge member thereof adapted for engagement with the usual crank shaft, the other section being adapted for cooperation with a bearing cap.

In testimony whereof I affix my signature.

CONRAD JOHNSON.